(12) United States Patent
Kawai et al.

(10) Patent No.: US 10,788,817 B2
(45) Date of Patent: Sep. 29, 2020

(54) MANUFACTURING PROCESS ANALYSIS DEVICE, MANUFACTURING PROCESS ANALYSIS METHOD, AND RECORDING MEDIUM WHEREUPON MANUFACTURING PROCESS ANALYSIS PROGRAM IS STORED

(71) Applicant: NEC Corporation, Minato-ku, Tokyo (JP)

(72) Inventors: Takazumi Kawai, Tokyo (JP); Katsuhiro Ochiai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 338 days.

(21) Appl. No.: 15/746,052

(22) PCT Filed: Aug. 2, 2016

(86) PCT No.: PCT/JP2016/003542
§ 371 (c)(1),
(2) Date: Jan. 19, 2018

(87) PCT Pub. No.: WO2017/022234
PCT Pub. Date: Feb. 9, 2017

(65) Prior Publication Data
US 2018/0267522 A1    Sep. 20, 2018

(30) Foreign Application Priority Data

Aug. 6, 2015 (JP) .............................. 2015-155885

(51) Int. Cl.
*G05B 19/418* (2006.01)
*G06Q 50/04* (2012.01)
*G06Q 10/06* (2012.01)

(52) U.S. Cl.
CPC ..... *G05B 19/41875* (2013.01); *G05B 19/418* (2013.01); *G05B 19/4183* (2013.01);
(Continued)

(58) Field of Classification Search
CPC ........... G05B 19/41875; G05B 19/418; G05B 19/4183; G05B 19/41885; G06Q 10/0639;
(Continued)

(56) References Cited

U.S. PATENT DOCUMENTS

2006/0167579 A1 * 7/2006 Fujii .................. G06Q 50/04
700/109

FOREIGN PATENT DOCUMENTS

JP    H06-110871 A    4/1994
JP    2004-078812 A   3/2004
(Continued)

OTHER PUBLICATIONS

Jiang et al, "Discovering Likely Invariants of Distributed Transaction Systems for Autonomic System Management", 2006, NEC Laboratories America, IEEE, p. 199-208 (Year: 2006).*
(Continued)

*Primary Examiner* — Kamini S Shah
*Assistant Examiner* — Faraj Ayoub

(57) ABSTRACT

Provided is a manufacturing process analysis device (30), comprising: a computation unit (31) which computes, in a process in which a manufactured object is manufactured, invariant compliance strengths for each shift time for manufacturing condition values (360) and quality values (361) which are measured in time series; a shift time specification unit (32) which derives, as a specified shift time, a shift time for which the invariant compliance strengths satisfy a baseline; and an analysis unit (33) which analyzes the state of the manufacturing process on the basis of the quality value and the manufacturing condition value for the time which is earlier by the specified shift time than the time at which the quality value is measured.

10 Claims, 11 Drawing Sheets

(52) U.S. Cl.
CPC ... G05B 19/41885 (2013.01); G06Q 10/0639 (2013.01); G06Q 50/04 (2013.01); *Y02P 90/02* (2015.11); *Y02P 90/22* (2015.11); *Y02P 90/30* (2015.11)

(58) Field of Classification Search
CPC ......... G06Q 50/04; Y02P 90/02; Y02P 90/22; Y02P 90/30
USPC .......................................................... 703/2
See application file for complete search history.

(56) References Cited

FOREIGN PATENT DOCUMENTS

| JP | 2004-186445 | A | | 7/2004 |
|---|---|---|---|---|
| JP | 2004186445 | A | * | 7/2004 |
| JP | 2006-228181 | A | | 8/2006 |
| JP | 4394728 | B2 | | 1/2010 |

OTHER PUBLICATIONS

Guofei Jiang et al., "Discovering likely invariants of distributed transaction systems for autonomic system management", DOI 10.1007/s10586-006-0008-1, Cluster Comput (2006) vol. 9, pp. 385-399.
International Search Report for PCT Application No. PCT/JP2016/003542, dated Sep. 20, 2016.
English translation of Written opinion for PCT Application No. PCT/JP2016/003542.

* cited by examiner

Fig. 2

| SENSOR ID | CATEGORY | COLLECTED DATA CONTENT | PLACEMENT LOCATION |
|---|---|---|---|
| 21-1 | MANUFACTURING CONDITION | HEATING TEMPERATURE | SECTION 1 |
| 21-2 | MANUFACTURING CONDITION | CONCENTRATION OF SUBSTANCE A | SECTION 2 |
| ... | ... | ... | ... |
| 21-m | MANUFACTURING CONDITION | COOLING TEMPERATURE | SECTION X |
| 22-1 | QUALITY | HARDNESS | SECTION 3 |
| 22-2 | QUALITY | DENSITY | SECTION 3 |
| ... | ... | ... | ... |
| 22-n | QUALITY | ELECTRICAL RESISTANCE VALUE | SECTION Y |

140 ATTRIBUTE INFORMATION

Fig. 3

160 MANUFACTURING CONDITION DATA

| SENSOR ID | COLLECTED DATA CONTENT | MEASUREMENT TIME | MEASURED VALUE |
|---|---|---|---|
| 21-1 | HEATING TEMPERATURE | 15:00 | 800 |
| | | 15:01 | 803 |
| | | ⋮ | ⋮ |
| 21-2 | CONCENTRATION OF SUBSTANCE A | 15:00 | 40 |
| | | 15:01 | 41 |
| | | ⋮ | ⋮ |
| ⋮ | ⋮ | ⋮ | ⋮ |

Fig. 4

161 QUALITY DATA

| SENSOR ID | COLLECTED DATA CONTENT | MEASUREMENT TIME | MEASURED VALUE |
|---|---|---|---|
| 22-1 | HARDNESS | 15:00 | 5.01 |
| | | 15:01 | 5.02 |
| | | ⋮ | ⋮ |
| 22-2 | DENSITY | 15:00 | 8.35 |
| | | 15:01 | 8.34 |
| | | ⋮ | ⋮ |
| ⋮ | ⋮ | ⋮ | ⋮ |

MANUFACTURING PROCESS ANALYSIS DEVICE, MANUFACTURING PROCESS ANALYSIS METHOD, AND RECORDING MEDIUM WHEREUPON MANUFACTURING PROCESS ANALYSIS PROGRAM IS STORED

This application is a National Stage Entry of PCT/JP2016/003542 filed on Aug. 2, 2016, which claims priority from Japanese Patent Application 2015-155885 filed on Aug. 6, 2015, the contents of all of which are incorporated herein by reference, in their entirety.

TECHNICAL FIELD

The present invention relates to a technology for analyzing the state of a manufacturing process, based on data, collected in time series, which indicate states of the manufacturing process.

BACKGROUND ART

In the quality control of a manufacturing process, values indicating a manufacturing condition for a product manufactured in the manufacturing process (manufacturing condition values) are set as an explanatory variable, and values indicating a quality of the product (quality values) are set as an objective variable. In the quality control, by analyzing a relation between the explanatory variable and the objective variable, the manufacturing condition that influences the quality values is specified.

As an example of a technology for analyzing the state of a manufacturing process as described above, PTL 1 discloses an influence factor specification device that is capable of analyzing process data (data indicating the state of the manufacturing process) even when explanatory variables include qualitative variables as well as quantitative variables or a correlation between an objective variable and an explanatory variable is not linear. The device separates each data set containing values of a quantitative variable among the explanatory variables into a plurality of segments according to levels that a qualitative variable among the explanatory variables has and, using complementary values, forms a pseudo data set that can be treated as a quantitative variable with respect to each segment. The device, by applying a multivariate analysis method to the explanatory variables composed of a set of pseudo data sets and an objective variable, specifies an influence factor influencing the objective variable.

PTL 2 discloses a modeling device that is capable of easily modeling a correlation between process data and result data in a semiconductor manufacturing process. The device acquires time series process data that were obtained by collecting, at a fixed period, process condition data obtained while a process was performed. The device next extracts data indicating a process feature amount from the process data and stores the extracted process feature amount. The device analyzes data for analysis, which are generated by, after combining the process feature amount data, inspection data, and malfunction data using product identifiers (hereinafter, referred to as "identification (ID)") as a key, removing invalid data, by means of data mining and creates a model.

PTL 3 discloses a method of analyzing a correlation between a pair of collected time series process data by shifting time and searching for a shift time at which the correlation becomes strongest. In the method, using a pair of process time series data selected based on a result of the search, a relation between the pair of process data is described as a process response model.

CITATION LIST

Patent Literature

[PTL 1] JP 4394728 B
[PTL 2] JP 2004-186445 A
[PTL 3] JP 2004-078812 A

Non-Patent Literature

[NPL 1] Guofei Jiang, Haifeng Chen, Kenji Yoshihira, "Discovering likely invariants of distributed transaction systems for autonomic system management", Cluster Comput (2006) Vol. 9: P385-399.

SUMMARY OF INVENTION

Technical Problem

Much of process data in a manufacturing process are time series measured values. In a manufacturing process, a product is, in general, formed by subjecting materials to be processed and the like to successive processing. In such a manufacturing process, times at which a specific process that influences product defects was performed are generally different from times at which quality values were measured. In addition, times at which a product or a portion of the product was subjected to processing differ with respect to each process. In other words, unless a difference between times at which manufacturing condition values are measured and times at which quality values are measured is appropriately corrected, a causal relation between a manufacturing condition and a quality cannot be clarified. In the devices described in PTLs 1 and 2, such a difference relating to measurement times is not taken into consideration. In particular, when time required for the whole manufacturing process is long relative to a time interval at which quality values are measured, such a difference relating to measurement times causes an inaccurate analysis to be done, which makes it difficult to specify a cause of defects accurately.

To solve the problem as described above, the method described in PTL 3 takes into consideration such a difference relating to measurement times by analyzing a correlation between a pair of collected time series process data by shifting time. However, since, in order to increase accuracy in such correlation analysis, it is, in general, required to set the above-described difference relating to measurement times to be short, it is difficult to clarify a causal relation between a manufacturing condition and a quality when a difference relating to measurement times is long. In addition, there is a case where no correlation is clarified depending on contents of the manufacturing process or conditions including positions at which sensors for measuring manufacturing condition values and quality values are placed and the like. In such a case, when the method described in PTL 3 is used, it becomes difficult to specify a cause of defects in the manufacturing process accurately.

Therefore, the technologies disclosed in PTLs 1 to 3 are insufficient to specify a cause of defects in a manufacturing process accurately. A principal object of the present invention is to provide a manufacturing process analysis device that solves the problem.

Solution to Problem

A manufacturing process analysis device according to one mode of the present invention includes: a computation means for, in a process in which a product is manufactured, with respect to manufacturing condition values that indicate a manufacturing condition relating to the product and were measured in time series and quality values that indicate a quality of the product and were measured in time series, computing a strength of invariant fitness with respect to each shift time, the shift time representing a difference between times at which the manufacturing condition values were measured and times at which the quality values were measured; a shift time specification means for specifying, as a specific shift time, the shift time when the computed strength of invariant fitness satisfies a criterion; and an analysis means for, based on the quality values and the manufacturing condition values at times going back from times at which the quality values were measured by the specific shift time specified by the shift time specification means, analyzing a state of the process.

In another aspect to achieve the object described above, a manufacturing process analysis method according to one mode of the present invention includes, by an information processing device: in a process in which a product is manufactured, with respect to manufacturing condition values that indicate a manufacturing condition relating to the product and were measured in time series and quality values that indicate a quality of the product and were measured in time series, computing a strength of invariant fitness with respect to each shift time, the shift time representing a difference between times at which the manufacturing condition values were measured and times at which the quality values were measured; specifying, as a specific shift time, the shift time when the computed strength of invariant fitness satisfies a criterion; and based on the quality values and the manufacturing condition values at times going back from times at which the quality values were measured by the specified specific shift time, analyzing a state of the process.

In still another aspect to achieve the object described above, a manufacturing process analysis program according to one mode of the present invention makes a computer execute: computation processing of, in a process in which a product is manufactured, with respect to manufacturing condition values that indicate a manufacturing condition relating to the product and were measured in time series and quality values that indicate a quality of the product and were measured in time series, computing a strength of invariant fitness with respect to each shift time, the shift time being a difference between times at which the manufacturing condition values were measured and times at which the quality values were measured; shift time specification processing of specifying, as a specific shift time, the shift time when the computed strength of invariant fitness satisfies a criterion; and analysis processing of, based on the quality values and the manufacturing condition values at times going back from times at which the quality values were measured by the specific shift time specified by the shift time specification processing, analyzing a state of the process.

Further, the present invention is also achievable by a non-transitory computer-readable recording medium storing the manufacturing process analysis program (computer program).

Advantageous Effects of Invention

The present invention enables a problem existing in a manufacturing process to be analyzed with higher accuracy, based on data, collected in time series, which indicate states of the manufacturing process.

BRIEF DESCRIPTION OF DRAWINGS

FIG. 2 is a diagram exemplifying a structure of attribute information 140 according to the first example embodiment of the present invention;

FIG. 3 is a diagram exemplifying a structure of manufacturing condition data 160 according to the first example embodiment of the present invention;

FIG. 4 is a diagram exemplifying a structure of quality data 161 according to the first example embodiment of the present invention;

DESCRIPTION OF EMBODIMENT

Hereinafter, example embodiments of the present invention will be described in detail with reference to the accompanying drawings.

First Example Embodiment

Figure 1:
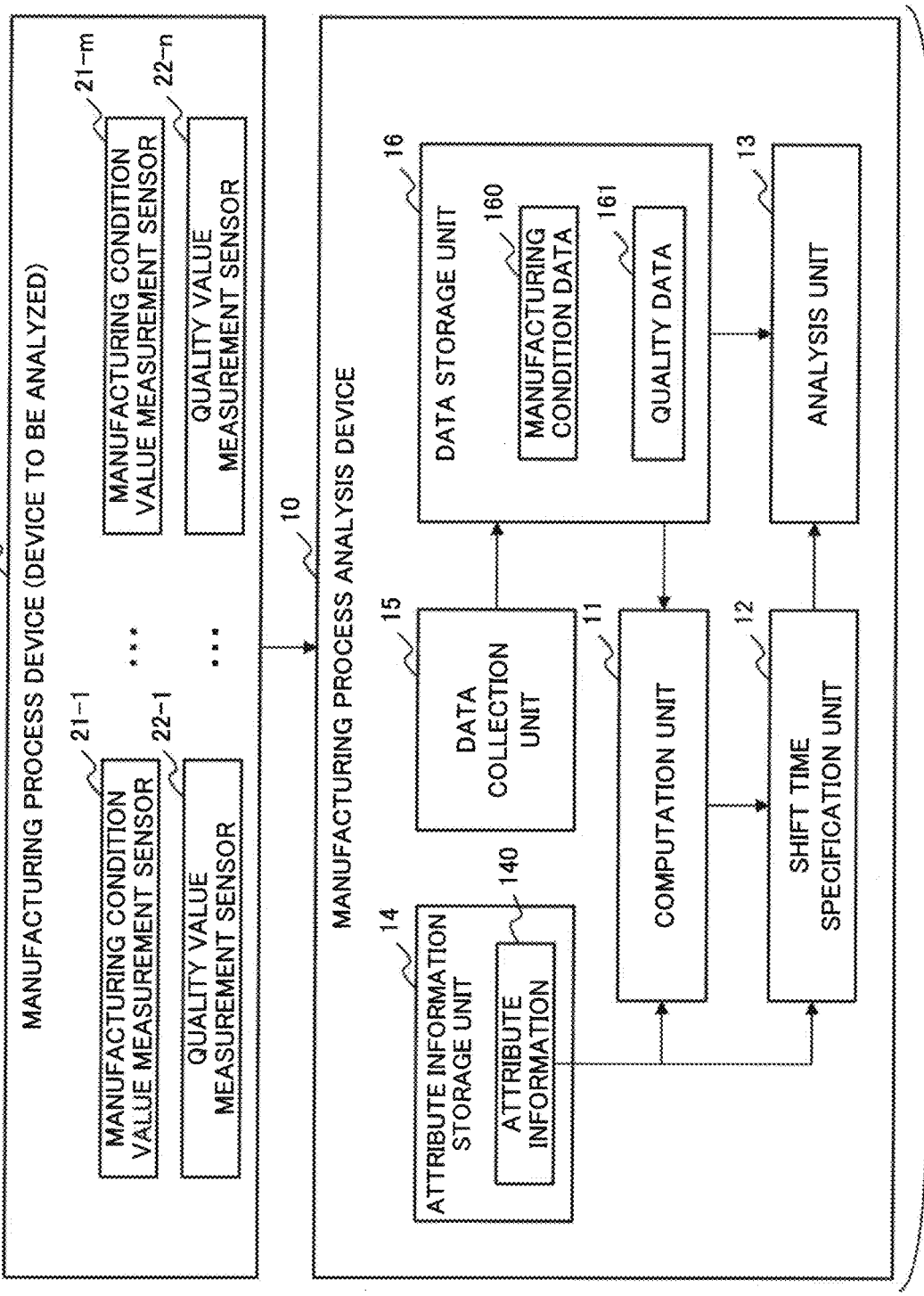
FIG. 1 is a block diagram illustrating a configuration of a manufacturing process analysis system 1 according to a first example embodiment of the present invention.

FIG. 1 is a block diagram conceptually illustrating a manufacturing process analysis system 1 according to a first example embodiment of the present invention. The manufacturing process analysis system 1 according to the present example embodiment includes, when broadly classified, a manufacturing process analysis device 10 and a manufacturing process device 20.

The manufacturing process device 20 is a device that manufactures a product (goods) in accordance with a predetermined manufacturing process. The manufacturing process analysis device 10 is a device that analyzes a problem existing in a manufacturing process that the manufacturing process device 20 performs. In other words, the manufacturing process device 20 is a device to be analyzed that the manufacturing process analysis device 10 sets as an analysis target.

In the manufacturing process device 20, manufacturing condition value measurement sensors 21-1 to 21-$m$ ($m$ is any integer equal to or greater than 1) and quality value measurement sensors 22-1 to 22-$n$ ($n$ is any integer equal to or greater than 1) are placed. The manufacturing condition value measurement sensors 21-1 to 21-$m$ are measurement instruments that measure manufacturing condition values in a manufacturing process and output results of the measurement as manufacturing condition data. The quality value measurement sensors 22-1 to 22-$n$ are measurement instruments that measure quality values of a product manufactured in accordance with the manufacturing process and output results of the measurement as quality data. The manufacturing condition value measurement sensors and quality value measurement sensors may output signals that are convertible to the data by means of an interface (not illustrated) with which the manufacturing process analysis device 10 is equipped.

As illustrated in FIG. 1, the manufacturing process analysis device 10 according to the present example embodiment includes a computation unit 11, a shift time specification unit 12, an analysis unit 13, an attribute information storage unit 14, a data collection unit 15, and a data storage unit 16. The computation unit 11, the shift time specification unit 12, the analysis unit 13, and the data collection unit 15 may be achieved by electronic circuits or by computer programs and a processor that operates in accordance with the computer programs. The attribute information storage unit 14 and the data storage unit 16 are storage devices, such as a memory and a magnetic disk. The attribute information storage unit 14 and the data storage unit 16 include a storage control function that is achieved by an electronic circuit or by a computer program and a processor operating in accordance with the computer program.

The attribute information storage unit 14 stores attribute information 140. The attribute information 140 is attribute information (domain information) relating to the manufacturing condition value measurement sensors 21-1 to 21-$m$ and the quality value measurement sensors 22-1 to 22-$n$.

In FIG. 2, a structure of the attribute information 140 according to the present example embodiment is exemplified. The attribute information 140 is information including records in which, with respect to each of the sensors placed in the manufacturing process device 20, items "sensor ID", "category", "collected data content", and "placement location" are associated with one another. The "sensor ID" is an item indicating an identifier capable of identifying each sensor. The "category" is an item indicating whether a sensor that each record indicates is a sensor for measuring a manufacturing condition value or a sensor for measuring a quality value of a product.

The "collected data content" is an item representing a content of data that the sensor collects. As illustrated in FIG. 2, the manufacturing condition value measurement sensor 21-1, for example, measures heating temperature, which is a manufacturing condition value. The quality value measurement sensor 22-$n$, for example, measures an electrical resistance value, which is a quality value of a product. The "placement location" is an item indicating, for example, a location where the sensor is placed and, in the present example embodiment, is indicated by a section unit.

Note that the structure of the attribute information 140 is not limited to the one illustrated in FIG. 2.

The data collection unit 15 collects manufacturing condition data output from the manufacturing condition value measurement sensors 21-1 to 21-$m$ and quality data output from the quality value measurement sensors 22-1 to 22-$n$.

The data collection unit 15 stores the collected manufacturing condition data and quality data in the data storage unit 16 as manufacturing condition data 160 and quality data 161, respectively.

In FIG. 3, a structure of the manufacturing condition data 160 according to the present example embodiment is exemplified. The manufacturing condition data 160 are information including records in which, with respect to each of the manufacturing condition value measurement sensors 21-1 to 21-$m$, items "sensor ID", "collected data content", "measurement time", and "measured value" are associated with one another. The "sensor ID" and "collected data content" are the same as those described with respect to FIG. 2. The "measurement time" and "measured value" are information indicating results of measurement by the respective sensors. As exemplified in FIG. 3, for example, the manufacturing condition value measurement sensor 21-1 according to the present example embodiment measures heating temperature every one minute. Note that the structure of the manufacturing condition data 160 is not limited to the one illustrated in FIG. 3.

In FIG. 4, a structure of the quality data 161 according to the present example embodiment is exemplified. The quality data 161 are information including records in which, with respect to each of the quality value measurement sensors 22-1 to 22-$n$, items "sensor ID", "collected data content", "measurement time", and "measured value" are associated with one another. The contents of the items are the same as those described with respect to FIG. 3. As exemplified in FIG. 4, for example, the quality value measurement sensor 22-1 according to the present example embodiment measures a hardness of a product every one minute. Note that the structure of the quality data 161 is not limited to the one illustrated in FIG. 4.

The computation unit 11 reads out the manufacturing condition data 160 and the quality data 161 from the data storage unit 16. The computation unit 11 selects a combination of a manufacturing condition value measurement sensor 21-$i$ ($i$ is any integer from 1 to $m$) and a quality value measurement sensor 22-$j$ ($j$ is any integer from 1 to $n$). With respect to the manufacturing condition value measurement sensor 21-$i$ and the quality value measurement sensor 22-$j$, the computation unit 11 sets any shift time and, with respect to the shift time, computes a strength of invariant fitness between a series of manufacturing condition values and a series of quality values. In the above, the shift time is a time representing a difference between a time at which each manufacturing condition value was measured and a time at which a corresponding quality value was measured. Note that, since a series of manufacturing condition values and a series of quality values are in a cause-and-result relationship in this order, it is presupposed that a time at which each manufacturing condition value was measured is earlier than a time at which a corresponding quality value was measured.

The invariant fitness will now be described. Time series events performed in a manufacturing process can be modeled. In other words, in a manufacturing process, time series values measured by a specific sensor can be expressed by a mathematical expression with values measured by another sensor, time, and the like as input variables. The modeling enables time series values measured by a specific sensor to be predicted by means of a mathematical expression expressing the model.

With respect to a first sensor in a manufacturing process, there exists prediction error (difference) between predicted values computed, by use of the model, from measured values measured by a second sensor and actually measured values. When the model properly represents events performed in the manufacturing process and no abnormality has occurred in the manufacturing process, the prediction error is small and settles to values equal to or smaller than a predetermined threshold value. In the present application, when the prediction error settles to values equal to or smaller than a predetermined threshold value as described above, the first sensor and the second sensor are referred to as "being in an invariant relation". In addition, as the prediction error decreases, the "invariant fitness" (invariant compliance) between the first sensor and the second sensor is referred to as "being stronger". It has been known that, when an abnormality has occurred in the manufacturing process related to the first and second sensors, the invariant relation is broken, as described in, for example, NPL 1. In addition, the strength of invariant fitness between the first sensor and the second sensor also varies because of shift time relating to the first and second sensors.

The computation unit 11 may compute the strength of invariant fitness between a series of manufacturing condition values and a series of quality values, based on an autoregressive exogenous (ARX) model. In this case, the computation unit 11, using a method described in, for example, NPL 1, computes the strength of invariant fitness between a series of manufacturing condition values and a series of quality values.

When setting, for example, 10 minutes as a shift time, the computation unit 11 extracts a measured value relating to the manufacturing condition value measurement sensor 21-$i$ measured at "15:00" from the manufacturing condition data 160 exemplified in FIG. 3. The computation unit 11, based on the extracted measured value relating to the manufacturing condition value measurement sensor 21-$i$ and a model representing the manufacturing process, computes a predicted value relating to the quality value measurement sensor 22-$j$ at "15:10". The computation unit 11 extracts a measured value relating to the quality value measurement sensor 22-$j$ measured at "15:10" from the quality data 161 exemplified in FIG. 4. The computation unit 11 computes a difference between the predicted value and the measured value as a prediction error relating to the quality value measurement sensor 22-$j$ at "15:10". In a similar manner, the computation unit 11, using a measured value relating to the manufacturing condition value measurement sensor 21-$i$ measured at "15:01", computes a predicted value relating to the quality value measurement sensor 22-$j$ at "15:11". The computation unit 11 computes a prediction error relating to the quality value measurement sensor 22-$j$ at "15:11". The computation unit 11, as described above, computes prediction error (that is, the strength of invariant fitness) relating to the manufacturing condition value measurement sensor 21-$i$ and the quality value measurement sensor 22-$j$ in the case where the shift time is set at 10 minutes, in time series.

The computation unit 11 changes a set value set to the shift time and, with respect to the changed shift time, performs similar processing. In a general manufacturing process, a range of shift time that enables a series of manufacturing condition values and a series of quality values to be in an invariant relation often depends on the attribute information of a manufacturing condition value measurement sensor 21-$i$ and a quality value measurement sensor 22-$j$. When the attribute information 140 is constituted as exemplified in FIG. 2, the range of shift time that enables a series of manufacturing condition values and a series of quality values to be in an invariant relation depends on the placement locations of the manufacturing condition value measurement sensor 21-$i$ and the quality value measurement sensor 22-$j$ and speed at which the manufacturing process progresses. Therefore, the computation unit 11 may, after setting a range of values that the shift time may take based on the attribute information 140 and the speed at which the manufacturing process progresses, change a set value set to shift time within the range.

The shift time specification unit 12, with respect to any shift time, determines whether or not a strength of invariant fitness between a series of manufacturing condition values and a series of quality values, which is computed by the computation unit 11, satisfies a criterion. When the strength of invariant fitness satisfies the criterion, the shift time specification unit 12 specifies the shift time as a specific shift time relating to the manufacturing condition value measurement sensor 21-$i$ and the quality value measurement sensor 22-$j$.

Figure 5:
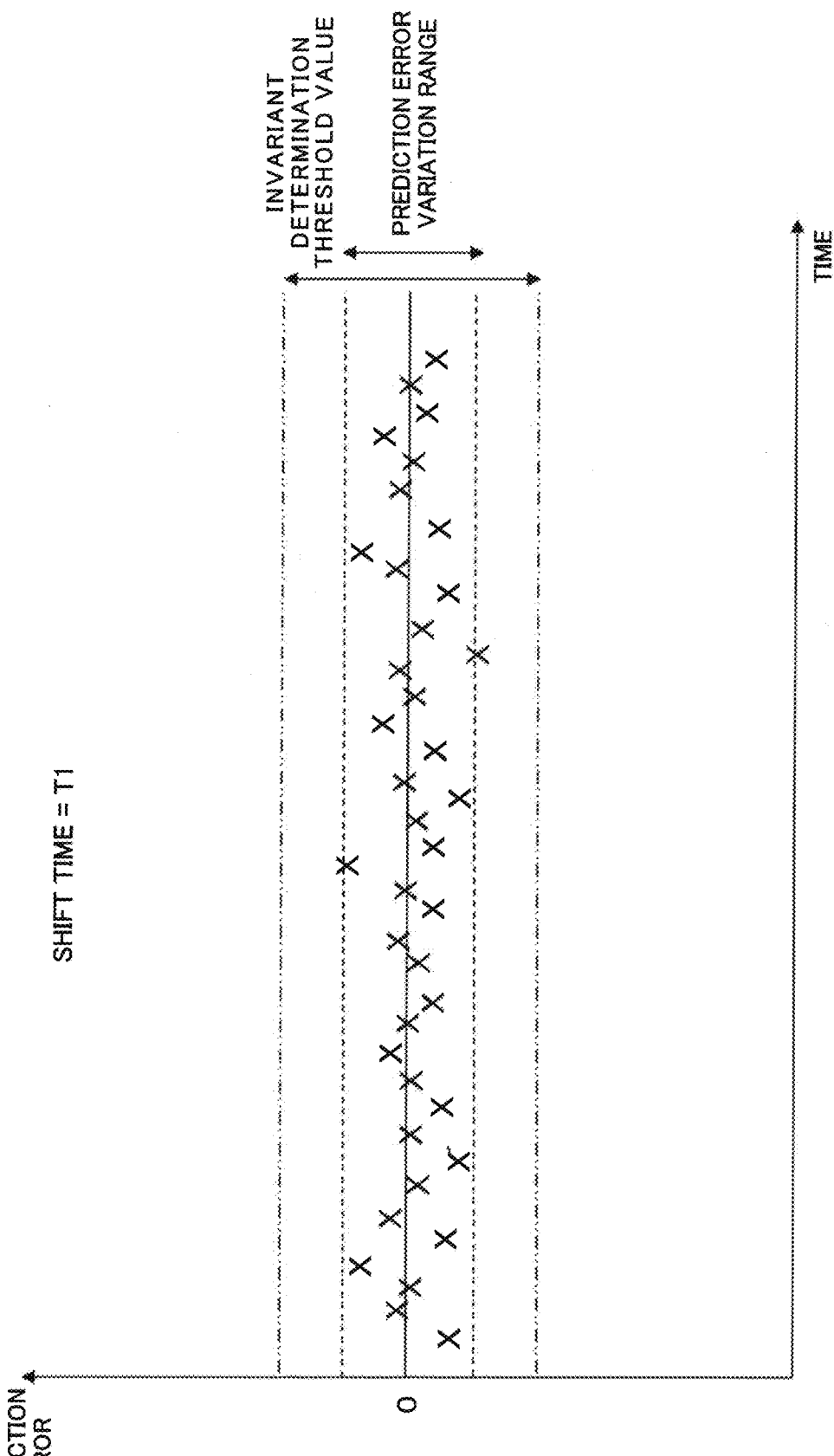
FIG. 5 is a diagram illustrating an example (when being in an invariant relation) of a graph indicating a temporal transition of prediction error according to the first example embodiment of the present invention.

In FIG. 5, a temporal transition of prediction error in the case where a series of manufacturing condition values and a series of quality values are in an invariant relation is exemplified. As exemplified in FIG. 5, a range of variation in the prediction error in a predetermined period falls equal to or less than an invariant determination threshold value. In this case, the shift time specification unit 12 specifies a shift time T1 at this time as a specific shift time.

Figure 6:
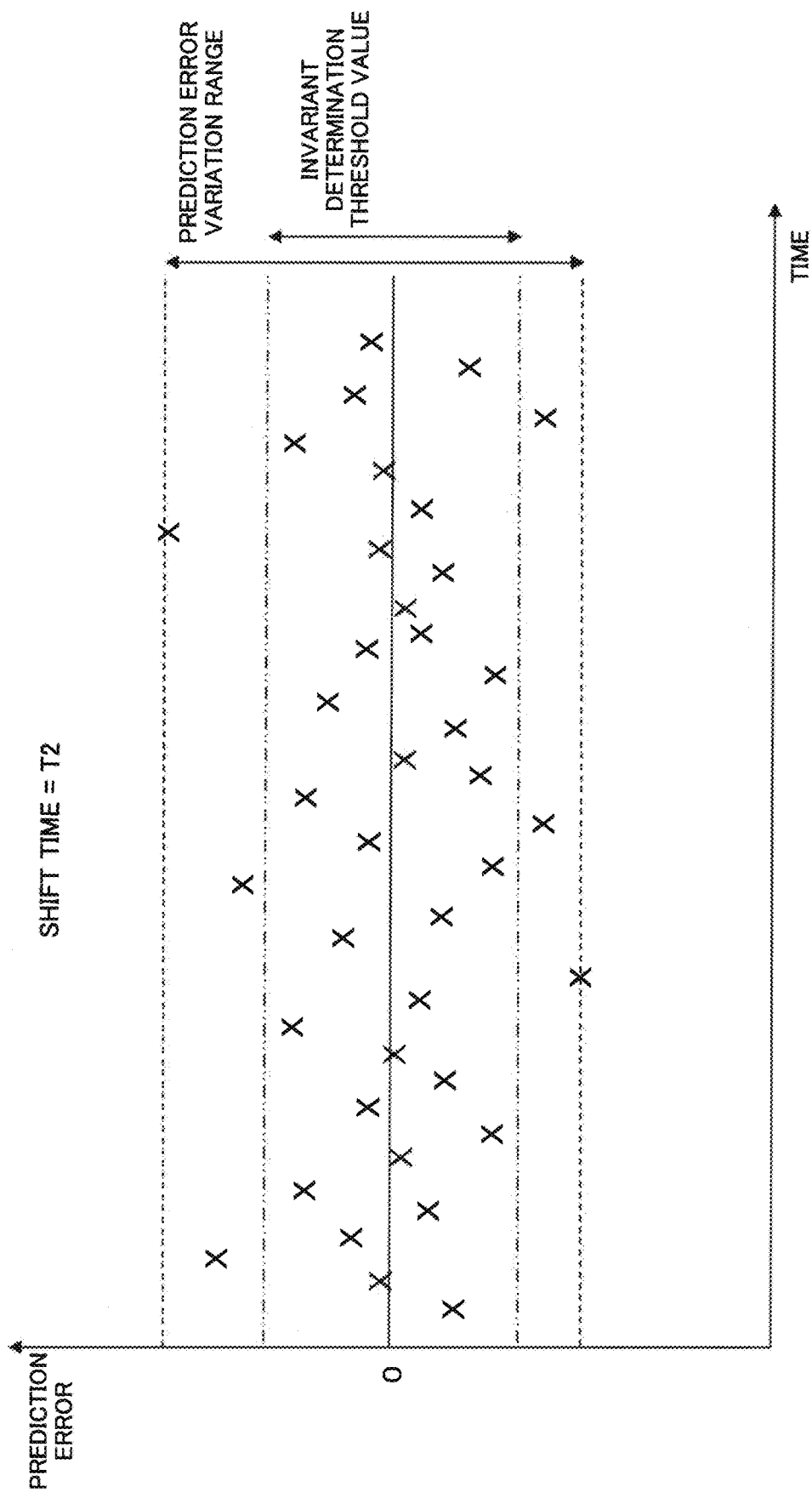
FIG. 6 is a diagram illustrating an example (when being not in an invariant relation) of a graph indicating a temporal transition of prediction error according to the first example embodiment of the present invention.

In FIG. 6, a temporal transition of prediction error in the case where a series of manufacturing condition values and a series of quality values are not in an invariant relation is exemplified. As exemplified in FIG. 6, a range of variation in the prediction error in a predetermined period exceeds the invariant determination threshold value. In this case, the shift time specification unit 12 does not specify a shift time T2 at this time as a specific shift time.

The shift time specification unit 12 may determine whether or not a series of manufacturing condition values and a series of quality values are in an invariant relation, based on a criterion relating to prediction error different from that in the examples illustrated in FIGS. 5 and 6. The shift time specification unit 12 may determine, for example, whether or not the average value of a range of variation in the prediction error is equal to or less than a threshold value.

There is a case where, with respect to a specific combination of a manufacturing condition value measurement sensor 21-$i$ and a quality value measurement sensor 22-$j$, there exist a plurality of shift times that cause a series of manufacturing condition values and a series of quality values to be in an invariant relation. There is a possibility that, for example, a shift time the value of which cannot be said to be appropriate when viewed from the perspective of a positional relation between the manufacturing condition value measurement sensor 21-$i$ and the quality value measurement sensor 22-$j$ and the like is included among the shift times. The shift time specification unit 12 may determine whether or not one or more the shift times are appropriate based on the attribute information 140.

Conversely, when existence of a plurality of shift times is appropriate, the shift time specification unit 12 sets a plurality of related series of manufacturing condition values as different series of manufacturing condition values in advance and sets different ranges for shift time specified from the attribute information. Since, in recent manufacturing devices, there is a possibility that one manufacturing condition value influences different products manufactured in a plurality of manufacturing time periods, as in a case of feeding back heat generated at a downstream stage of a process and preheating initial inflow materials with the fed back heat, the setting described above is required in some cases.

The shift time specification unit 12, with respect to the manufacturing condition value measurement sensor 21-$i$ and the quality value measurement sensor 22-$j$, inputs a specific shift time that causes a series of manufacturing condition values and a series of quality values to be in an invariant relation to the analysis unit 13.

When, with respect to the manufacturing condition value measurement sensor 21-$i$ and the quality value measurement sensor 22-$j$, there is no shift time that causes a series of manufacturing condition values and a series of quality values to be in an invariant relation, the shift time specification unit 12, based on the attribute information 140, specifies a specific shift time for this case. When the attribute information 140 is constituted as exemplified in FIG. 2, the shift time in general depends on the placement locations (relative positional relation) of the manufacturing condition value measurement sensor 21-$i$ and the quality value measurement sensor 22-$j$ and speed at which the manufacturing process progresses. The shift time specification unit 12 can, from sections in which the respective sensors are placed, which are indicated by the attribute information 140 exemplified in FIG. 2, specify a relative positional relation including, for example, a distance between the sensors. Therefore, in this case, the shift time specification unit 12, based on the attribute information 140 and speed at which the manufacturing process progresses, specifies a specific shift time in accordance with a predetermined procedure. It is assumed that the shift time specification unit 12 is provided with the procedure by, for example, the administrator of the manufacturing process analysis device 10 in advance.

Figure 7:
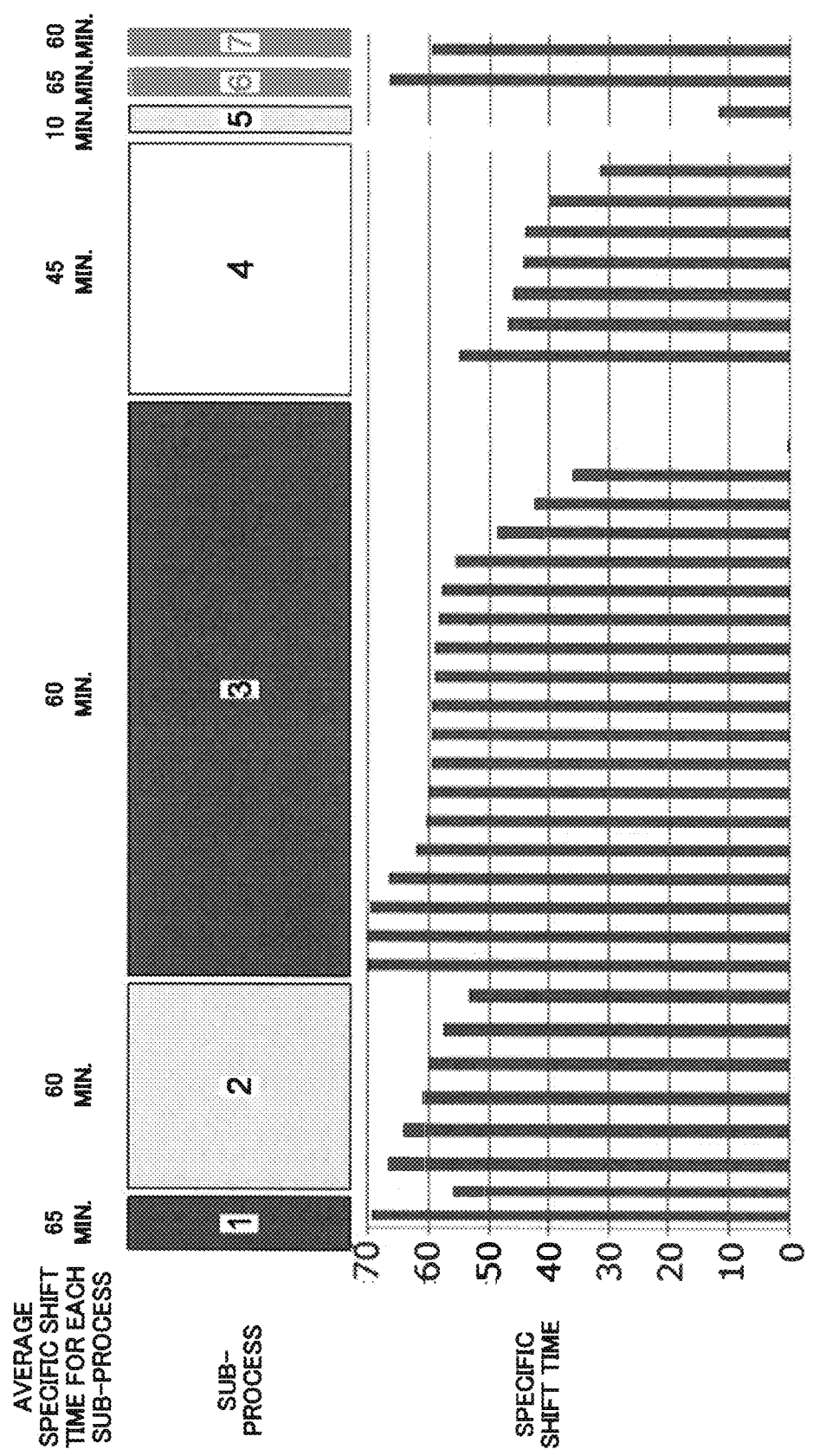
FIG. 7 is a diagram exemplifying a distribution status of specific shift time in the case where a manufacturing process according to the first example embodiment of the present invention includes a plurality of sub-processes.

When, with respect to the manufacturing condition value measurement sensor 21-$i$ and the quality value measurement sensor 22-$j$, there is no shift time that causes a series of manufacturing condition values and a series of quality values to be in an invariant relation, the shift time specification unit 12 may determine a target specific shift time using a specific shift time between separate series of manufacturing condition values both of which are in an invariant relation with the series of quality value. For example, a case where, with respect to a manufacturing condition value measurement sensor 21-$k$ (k is any integer from 1 to m) and the quality value measurement sensor 22-$j$, a specific shift time (first specific shift time) has already been specified is considered. In addition, it is assumed that, with respect to the manufacturing condition value measurement sensors 21-$i$ and 21-$k$, a specific shift time (second specific shift time) has also been specified by the computation unit 11 and the shift time specification unit 12. Note that it is assumed that the computation unit 11 also computes a strength of invariant fitness between separate series of manufacturing condition values. It is also assumed that the shift time specification unit 12 specifies a specific shift time between the series of manufacturing condition values. In this case, the shift time specification unit 12, by adding the second specific shift time to the first specific shift time, specifies a specific shift time relating to the manufacturing condition value measurement sensor 21-$i$ and the quality value measurement sensor 22-$j$. In other words, in this case, the shift time specification unit 12 specifies a shift time in a relative manner, based on a plurality of specific shift times that have already been specified. In FIG. 7, a distribution status of specific shift times in the case where a manufacturing process includes seven sub-processes is exemplified. In this case, a product manufactured by the manufacturing process device 20, after going through the sub-processes 1 to 7 in this sequence, is completed. The bar chart exemplified in the lower part of FIG. 7 illustrates a value of specific shift time for each combination of a manufacturing condition value measurement sensor 21-$i$ and a quality value measurement sensor 22-$j$. FIG. 7 illustrates specific shift times by sorting them in descending order thereof with respect to each sub-process. In other words, one bar in the bar chart represents one combination. Times exemplified in the upper part of FIG. 7 are average values of specific shift times for each sub-process.

As exemplified in FIG. 7, the average specific shift time for each sub-process, in general, tends to be longer in earlier sub-processes and to become shorter as the manufacturing process progresses. However, in the example in FIG. 7, the average specific shift times for the sub-processes 6 and 7, which are sub-processes at the final stage, have long values, which are equivalent to the value of average specific shift time for the sub-process 1. This is because the manufacturing process device 20 feeds back high-temperature gas obtained by cooling a high-temperature product in the sub-processes 6 and 7 to the sub-process 1. The feed-back process causes specific shift times until influence of the sub-processes 6 and 7 on the quality of the product materializes to be equivalent to specific shift times for the sub-process 1 in the manufacturing process exemplified in FIG. 7.

In the manufacturing process exemplified in FIG. 7, when, among the specific shift times for each combination of a manufacturing condition value measurement sensor 21-$i$ and a quality value measurement sensor 22-$j$, the value of a specific shift time substantially differs from an average specific shift time for each sub-process, the reliability of the specific shift time is considered to be low. Therefore, in this case, the shift time specification unit 12 may, instead of inputting a specific shift time to the analysis unit 13 with respect to each combination of a manufacturing condition value measurement sensor 21-$i$ and a quality value measurement sensor 22-$j$, compute an average specific shift time for each sub-process and subsequently input the computed average specific shift time to the analysis unit 13.

Alternatively, when the manufacturing process includes a plurality of sub-processes, the shift time specification unit 12 may, with respect to each sub-process, based on a plurality of specific shift times related to the sub-process and strengths of invariant fitness related to the respective specific shift times, input a representative value of the specific shift times to the analysis unit 13. In this case, the shift time specification unit 12, by, for example, weighting the respective specific shift times with strengths of invariant fitness related to the specific shift times, computes a representative value of the specific shift times.

The analysis unit 13, based on the manufacturing condition data 160 and the quality data 161 read out from the data storage unit 16, analyzes the state of the manufacturing process in the manufacturing process device 20. In the processing, the analysis unit 13, based on a specific series of quality values in the quality data 161 and a series of manufacturing condition values in the manufacturing condition data 160 at times going back from times at which the specific series of quality values were measured by a specific shift time input from the shift time specification unit 12, analyzes the state of the manufacturing process.

When, for example, any series of quality values in the quality data 161 indicates an abnormal value, the analysis unit 13 analyzes whether or not at least any of one or more series of manufacturing condition values that are in a causal relation with the series of quality values indicates an abnormal value. The analysis unit 13 may perform such an analysis in an automatic manner or may provide the user with an analysis result as information supporting the user in performing detailed analysis.

When, with respect to a specific combination of a manufacturing condition value measurement sensor 21-$i$ and a quality value measurement sensor 22-$j$, a plurality of specific shift times are input from the shift time specification unit 12, the analysis unit 13 performs an analysis with respect to the combination using the plurality of specific shift times.

Figure 8A:
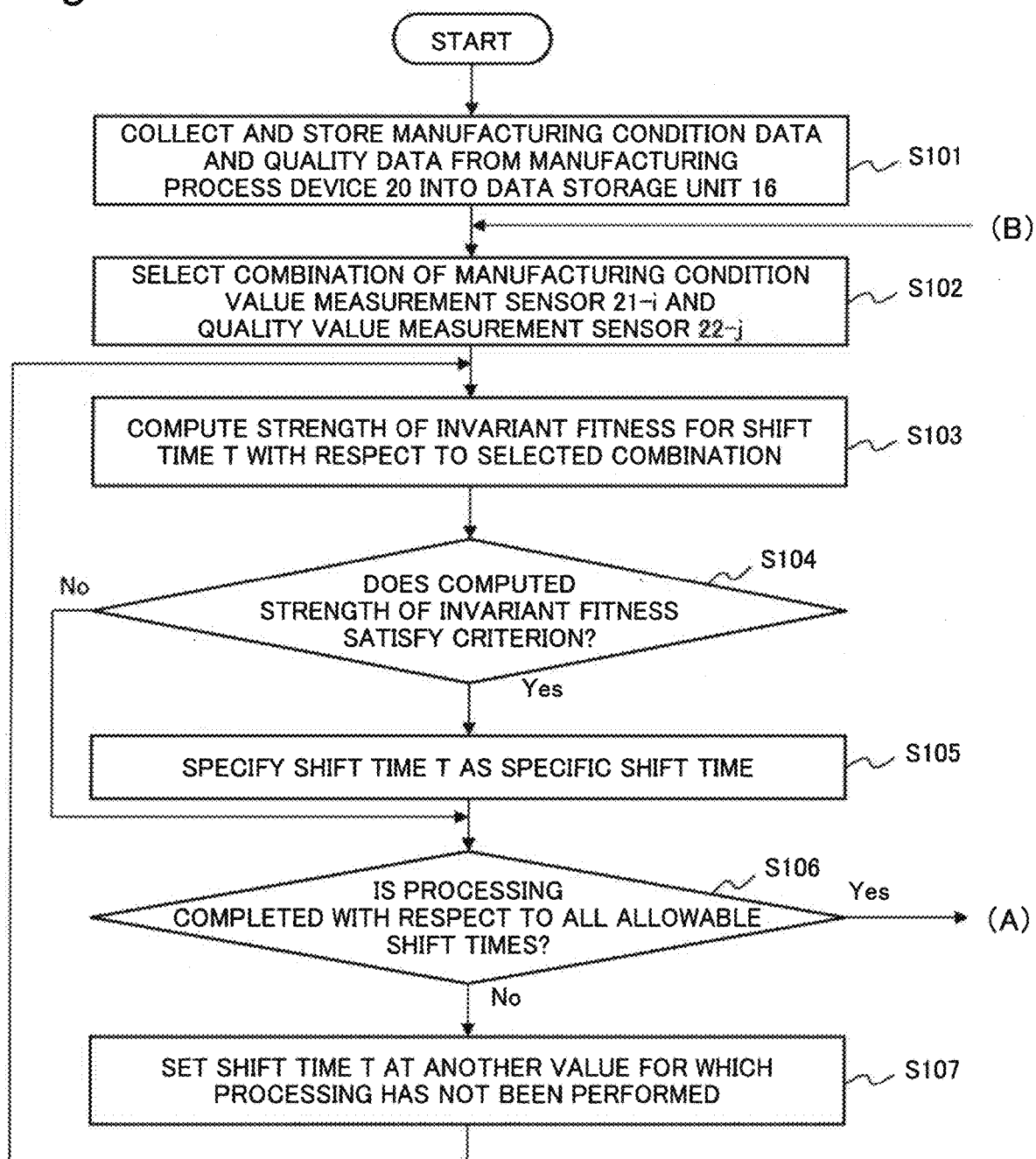
FIG. 8A is a flowchart (1/2) illustrating an operation of a manufacturing process analysis device 10 according to the first example embodiment of the present invention.
Figure 8B:
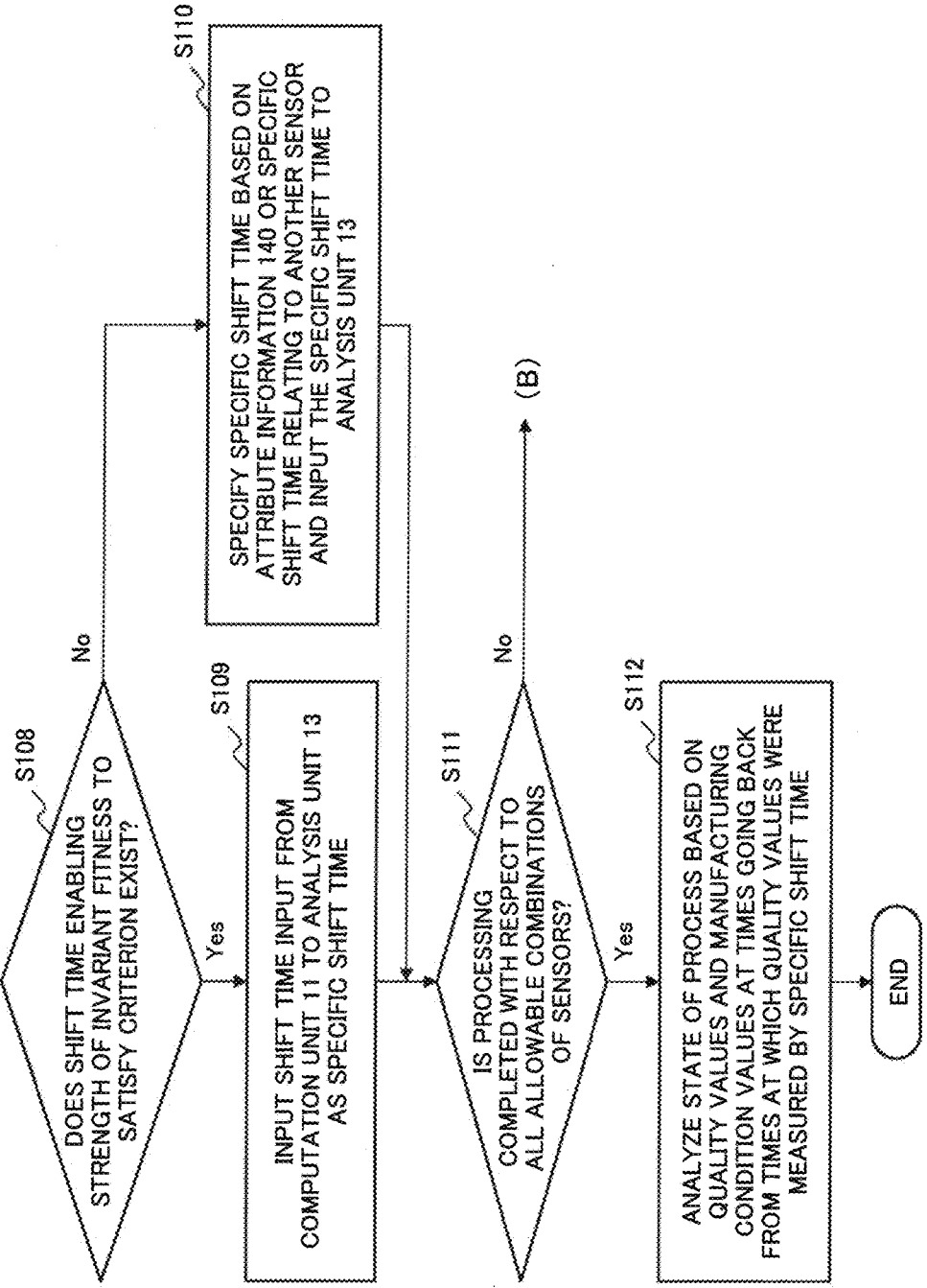
FIG. 8B is a flowchart (2/2) illustrating the operation of the manufacturing process analysis device 10 according to the first example embodiment of the present invention.

Next, referring to a flowchart in FIGS. 8A and 8B, an operation (processing) of the manufacturing process analysis device 10 according to the present example embodiment will be described in detail.

The data collection unit 15 collects and stores manufacturing condition data and quality data from the manufacturing process device 20 into the data storage unit 16 as the manufacturing condition data 160 and the quality data 161, respectively (step S101). The computation unit 11 selects a combination of a manufacturing condition value measurement sensor 21-$i$ and a quality value measurement sensor 22-$j$ (step S102). The computation unit 11, with respect to the selected combination, computes a strength of invariant fitness for a shift time T (step S103).

When the computed strength of invariant fitness satisfies a criterion (Yes in step S104), the shift time specification unit 12 specifies the shift time T as a specific shift time (step S105). When the computed strength of invariant fitness does not satisfy the criterion (No in step S104), the processing proceeds to step S106.

When there exists a shift time for which the computation unit 11 has not performed the above processing among all allowable shift times (No in step S106), the computation unit 11 sets the shift time T at the shift time for which the processing has not been performed (step S107), and the processing returns to step S103. When the computation unit 11 has completed the processing for all allowable shift times (Yes in step S106), the processing proceeds to step S108.

When a shift time at which a strength of correlation computed by the computation unit 13 in step S103 can satisfy a criterion exists among the shift times processed by the computation unit 11 (Yes in step S108), the shift time specification unit 12 inputs the shift time input from the computation unit 11 to the analysis unit 13 as a specific shift time (step S109). When no shift time at which a strength of correlation satisfies the criterion exists (No in step S108), the shift time specification unit 12, based on the attribute information 140 or specific shift times relating to other sensors, specifies a specific shift time and inputs the specific shift time to the analysis unit 13 (step S110).

When there exists a combination of sensors for which the computation unit 11 and the shift time specification unit 12 have not performed the processing among all allowable combinations of sensors (No in step S111), the processing returns to step S102. When the computation unit 11 and the shift time specification unit 12 have completed the processing with respect to all allowable combinations of sensors (Yes in step S111), the analysis unit 13, based on a series of quality values and a series of manufacturing condition values at times going back from times at which the series of quality values were measured by the specific shift time, analyzes the state of the process (step S112), and the whole processing is finished.

The manufacturing process analysis device 10 according to the present example embodiment can, based on data, collected in time series, that indicate states of a manufacturing process, analyze a problem existing in the manufacturing process with higher accuracy. This is because the manufacturing process analysis device 10 operates in a manner as follows. That is:

the computation unit 11, with respect to manufacturing condition values and quality values, both measured in time series, computes a strength of invariant fitness with respect to each shift time;

the shift time specification unit 12 specifies a shift time when the strength of invariant fitness satisfies a criterion as a specific shift time; and the analysis unit 13, based on a series of quality values and a series of manufacturing condition values at times going back from times at which the series of quality values were measured by the specific shift time specified by the shift time specification unit 12, analyzes the state of the manufacturing process.

Advantageous effects achieved by the manufacturing process analysis device 10 according to the present example embodiment will be described in detail below.

In a manufacturing process, times at which a specific process that influences product defects was performed are generally different from times at which a series of quality values were measured. In addition, times at which a product or a portion of the product was subjected to processing differ with respect to each process. In other words, unless a difference (shift time) between times at which a series of manufacturing condition values are measured and times at which a series of quality values are measured is appropriately corrected, a causal relation between a manufacturing condition and a quality cannot be clarified. Therefore, a technology capable of correcting a shift time with high accuracy is expected. In this case, correcting a shift time with high accuracy by, for example, computing a strength of correlation between a series of manufacturing condition values and a series of quality values is conceivable. However, since, in order to increase accuracy in such correlation analysis, it is generally required to set the above-described difference relating to measurement times to be short, it is difficult to clarify a causal relation between a manufacturing condition and a quality when the difference relating to measurement times is long. In addition, there is a case where no correlation is clarified depending on contents of the manufacturing process or conditions including positions at which sensors for measuring manufacturing condition values and quality values are placed and the like. Therefore, there is a problem in that it is difficult to correct a shift time with high accuracy.

On the contrary, in the manufacturing process analysis device 10 according to the present example embodiment, the computation unit 11, with respect to manufacturing condition values and quality values, both measured in time series, computes a strength of invariant fitness with respect to each shift time. The shift time specification unit 12 specifies a shift time when the strength of invariant fitness satisfies a criterion as a specific shift time. In other words, the manufacturing process analysis device 10 according to the present example embodiment can specify a longer shift time, which was difficult to be specified in the case of performing correlation analysis between manufacturing condition values and quality values. In addition, the analysis unit 13, based on a series of quality values and a series of manufacturing condition values at times going back from times at which the series of quality values were measured by the specific shift time of higher accuracy specified by the shift time specification unit 12, analyzes the state of the manufacturing process. The above processing enables the manufacturing process analysis device 10 according to the present example embodiment to, based on data, collected in time series, which indicate states of the manufacturing process, analyze a problem existing in the manufacturing process with higher accuracy.

In addition, the computation unit 11 according to the present example embodiment can compute a strength of correlation between a series of manufacturing condition values and a series of quality values, based on an autoregressive exogenous model (ARX model). Therefore, the manufacturing process analysis device 10 according to the present example embodiment can, by computing a strength of correlation accurately and efficiently, analyze the manufacturing process more accurately and efficiently.

In addition, when, with respect to a specific combination of a manufacturing condition value measurement sensor 21-$i$ and a quality value measurement sensor 22-$j$, there exist a plurality of shift times that cause a series of manufacturing condition values and a series of quality values to be in an invariant relation, the shift time specification unit 12 according to the present example embodiment outputs the plurality of shift times. The analysis unit 13, by using the plurality of specific shift times obtained through the shift time specification unit 12, analyzes the state of the manufacturing process. That is, the manufacturing process analysis device 10 according to the present example embodiment can, by using data, existing in the manufacturing process, that indicate a causal relation between manufacturing condition values and quality values as much as possible, further increase accuracy in analyzing the manufacturing process. Note that the shift time specification unit 12 according to the present example embodiment may output a shift time that maximizes the strength of invariant fitness between a series of manufacturing condition values and a series of quality values out of the above-described plurality of shift times. In this case, the manufacturing process analysis device 10 according to the present example embodiment can, by narrowing down data indicating a causal relation between manufacturing condition values and quality values, analyze the manufacturing process efficiently.

In addition, the computation unit 11 according to the present example embodiment, after setting a range of values that the shift time may take based on the attribute information 140 and speed at which the manufacturing process progresses, changes a set value set to the shift time within the range. The above processing enables the computation unit 11 to obtain a target shift time exhaustively and efficiently.

In addition, the shift time specification unit 12 according to the present example embodiment can determine whether or not one or more shift times that cause a series of manufacturing condition values and a series of quality values to be in an invariant relation are appropriate based on the attribute information 140. This capability enables the manufacturing process analysis device 10 according to the present example embodiment to analyze the manufacturing process more accurately.

In addition, when the manufacturing process includes a plurality of sub-processes, the shift time specification unit 12 according to the present example embodiment can, with respect to each sub-process, based on a plurality of specific shift times related to the sub-process and strengths of invariant fitness related to the respective specific shift times, specify a representative value of the specific shift times. This capability enables the manufacturing process analysis device 10 according to the present example embodiment to decrease influence of a specific shift time the reliability of which is considered to be low on the manufacturing process analysis and to analyze the manufacturing process more accurately.

Further, when there exists no shift time that satisfies a criterion with respect to a specific combination of a series of manufacturing condition values and a series of quality values, the shift time specification unit 12 according to the present example embodiment specifies a specific shift time, based on the attribute information 140 or a shift time that is specified with respect to a combination different from the specific combination. That is, the shift time specification unit 12 according to the present example embodiment can, by specifying more specific shift times, increase accuracy in analyzing the manufacturing process.

Second Example Embodiment

Figure 9:
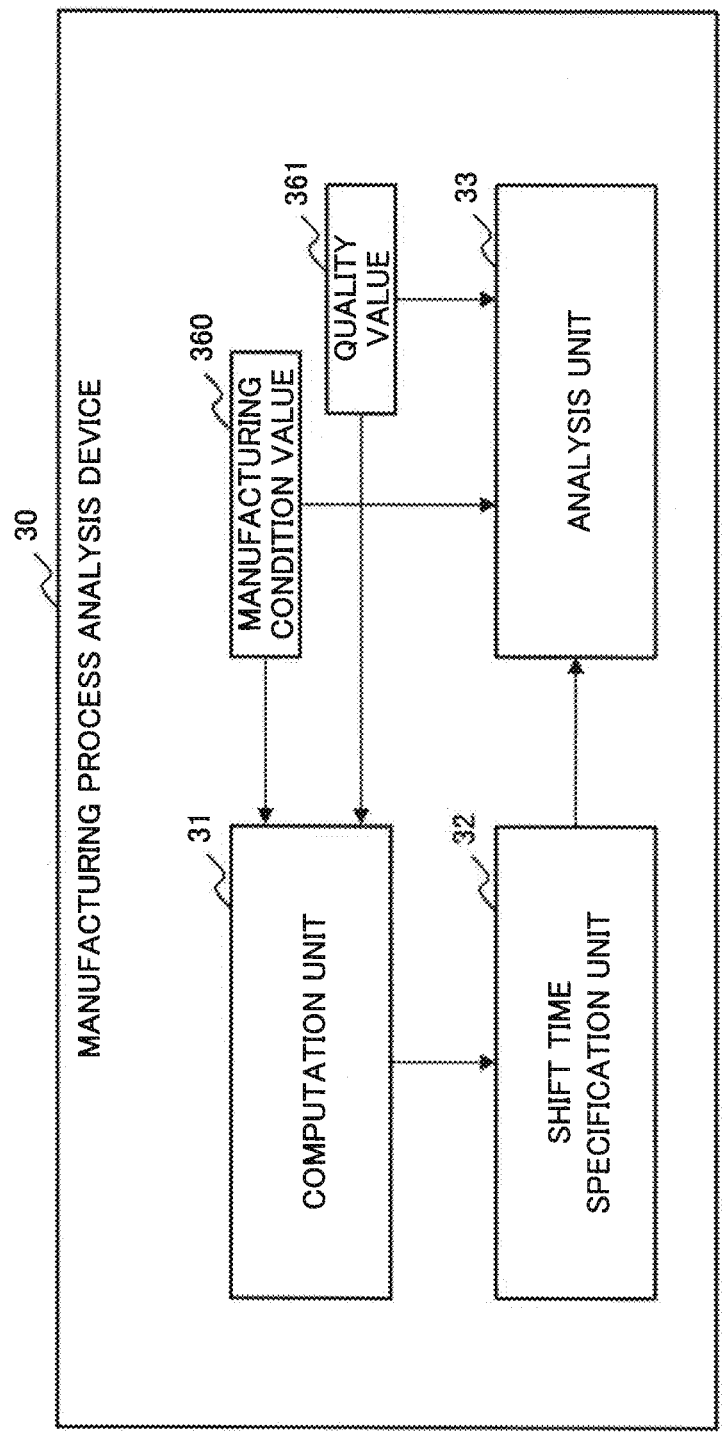
FIG. 9 is a block diagram illustrating a configuration of a manufacturing process analysis device 30 according to a second example embodiment of the present invention.

FIG. 9 is a block diagram conceptually illustrating a configuration of a manufacturing process analysis device 30 according to a second example embodiment.

The manufacturing process analysis device 30 according to the present example embodiment includes a computation unit 31, a shift time specification unit 32, and an analysis unit 33.

In a process in which a product is manufactured, the computation unit 31, with respect to manufacturing condition values 360 and quality values 361, both measured in time series, computes a strength of invariant fitness with respect to each shift time. The manufacturing condition values 360 are values indicating a manufacturing condition relating to the product. The quality values 361 are values indicating a quality of the product. The shift time is a time representing a difference between a time at which a manufacturing condition value 360 was measured and a time at which a corresponding quality value 361 was measured.

The shift time specification unit 32 specifies a shift time when the strength of invariant fitness satisfies a criterion as a specific shift time.

The analysis unit 33, based on a series of quality values concerned and a series of manufacturing condition values at times going back from times at which the series of quality values were measured by the specific shift time specified by the shift time specification unit 32, analyzes the state of the process.

The manufacturing process analysis device 30 according to the present example embodiment can, based on data, collected in time series, that indicate states of a manufacturing process, analyze a problem existing in the manufacturing process with higher accuracy. This is because the manufacturing process analysis device 30 operates in a manner as follows. That is:

the computation unit 31, with respect to manufacturing condition values and quality values, both measured in time series, computes a strength of invariant fitness with respect to each shift time;

the shift time specification unit 32 specifies a shift time when the strength of invariant fitness satisfies a criterion as a specific shift time; and the analysis unit 33, based on a series of quality values and a series of manufacturing condition values at times going back from times at which the series of quality values were measured by the specific shift time specified by the shift time specification unit 32, analyzes the state of the manufacturing process.

<Hardware Configuration Example>

The respective components illustrated in FIGS. 1 and 9 in the respective above-described example embodiments can be achieved by dedicated hardware (HW) (electronic circuits). In addition, in FIGS. 1 and 9, at least the following components can be viewed as functional (processing) units (software modules) of a software program:

the computation units 11 and 31;
the shift time specification units 12 and 32;
the analysis units 13 and 33;
the data collection unit 15; and
the storage control function that the attribute information storage unit 14 and the data storage unit 16 include.

However, the division of the respective components illustrated in the drawings is a configuration for the purpose of description, and, in actual implementation, various configurations can be conceived. An example of a hardware environment in this case will be described with reference to FIG. 10.

Figure 10:
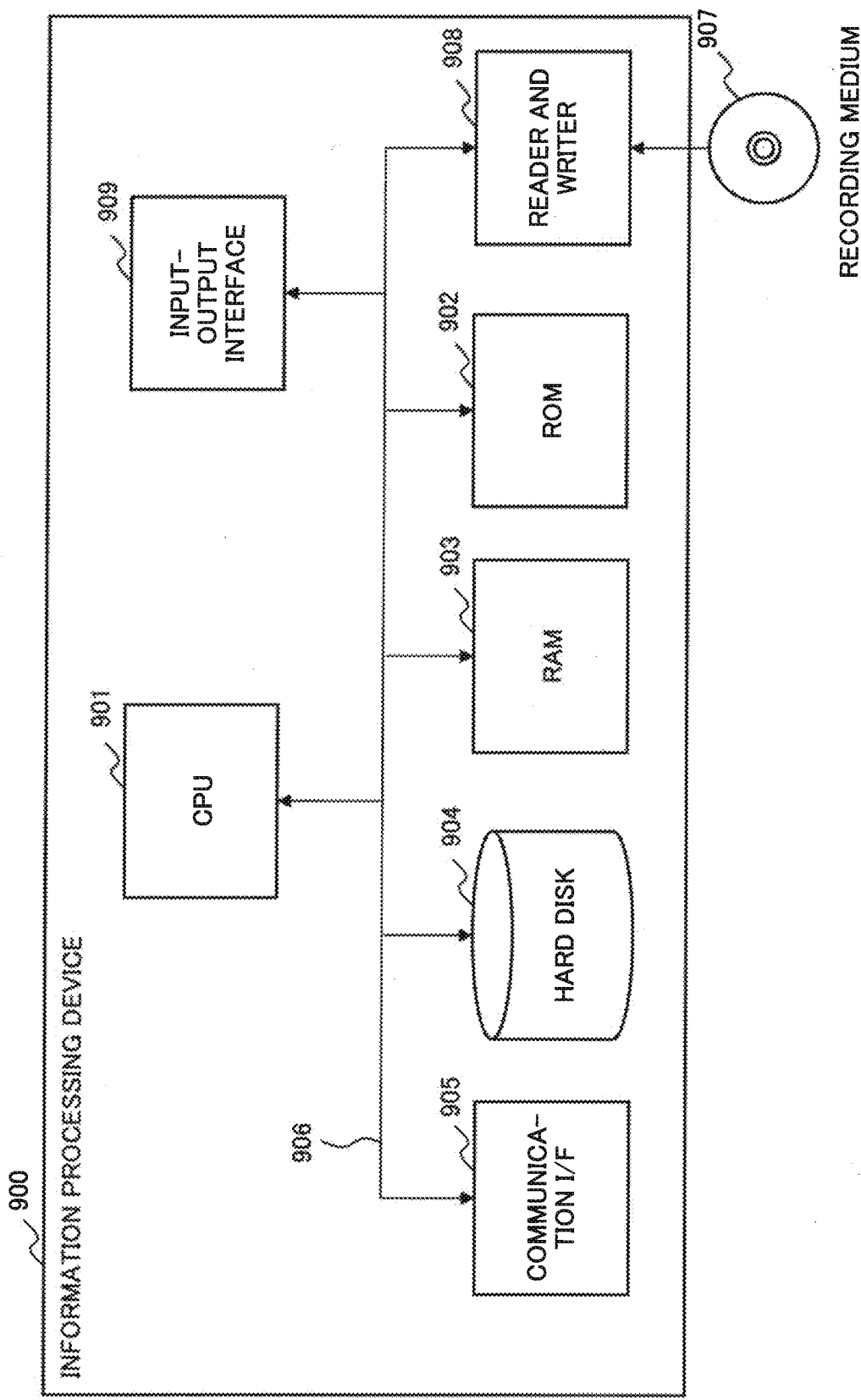
FIG. 10 is a block diagram exemplifying a configuration of an information processing device that is capable of executing a manufacturing process analysis device according to each example embodiment of the present invention.

FIG. 10 is a diagram describing, in an exemplifying manner, a configuration of an information processing device 900 (computer) that is capable of executing a manufacturing process analysis device according to each example embodiment of the present invention. That is, FIG. 10 illustrates a hardware environment that is a configuration of a computer (information processing device) capable of achieving a manufacturing process analysis device illustrated in FIGS. 1 and 9 and is capable of achieving the respective functions in the above-described example embodiments.

The information processing device 900 illustrated in FIG. 10 includes the following components as composing elements:

a central processing unit (CPU) 901;
a read only memory (ROM) 902;
a random access memory (RAM) 903;
a hard disk (storage device) 904;
a communication interface 905 with an external device;
a bus 906 (communication line);
a reader and writer 908 that is capable of reading and writing data stored in a recording medium 907, such as a compact disc read only memory (CD-ROM); and
an input-output interface 909.

In other words, the information processing device 900 that includes the above-described composing elements is a general computer in which the components as described above are interconnected by way of the bus 906.

The present invention that was described using the above-described example embodiments as examples provides the information processing device 900 illustrated in FIG. 10 with a computer program that is capable of achieving the following functions. The functions are the computation units 11 and 13, the shift time specification units 12 and 32, the analysis units 13 and 33, the data collection unit 15, and the storage control function that the attribute information storage unit 14 and the data storage unit 16 include in the block configuration diagrams (FIGS. 1 and 9), which were referred to in the descriptions of the example embodiments, or functions described in the flowcharts (FIGS. 8A and 8B). The present invention is subsequently achieved by reading out the computer program into the CPU 901 in the hardware and interpreting and executing the computer program. The computer program provided into the device may be stored in a readable and writable volatile memory (the RAM 903) or a non-volatile storage device, such as the hard disk 904.

In the case described afore, a method that is commonly used currently may be employed as a provision method of the computer program into the hardware. Such methods include, for example, a method of installing the computer program into the device by way of various recording media 907 such as a CD-ROM and a method of downloading the computer program from the outside by way of a communication line such as the Internet. In such a case, it may be viewed that the present invention is configured with codes composing such a computer program or the recording medium 907 in which the codes are stored.

The present invention was described above using the above-described example embodiments as typical examples. However, the present invention is not limited to the above-described example embodiments. In other words, various modes that could be understood by a person skilled in the art may be applied within the scope of the present invention.

INDUSTRIAL APPLICABILITY

The present invention is also applicable to a use for monitoring abnormalities in a manufacturing process, optimal control of a plant that is performed combined with an optimization device for a manufacturing process, or the like.

This application is based upon and claims the benefit of priority from Japanese patent application No. 2015-155885, filed on Aug. 6, 2015, the disclosure of which is incorporated herein in its entirety by reference.

REFERENCE SIGNS LIST

1 Manufacturing process analysis system
10 Manufacturing process analysis device
11 Computation unit
12 Shift time specification unit
13 Analysis unit
14 Attribute information storage unit
140 Attribute information
15 Data collection unit
16 Data storage unit
160 Manufacturing condition data
161 Quality data
20 Manufacturing process device
21-1 to 21-m Manufacturing condition value measurement sensor
22-1 to 22-n Quality value measurement sensor
30 Manufacturing process analysis device
31 Computation unit
32 Shift time specification unit
33 Analysis unit
360 Manufacturing condition values
361 Quality values
900 Information processing device
901 CPU
902 ROM
903 RAM
904 Hard disk (storage device)
905 Communication interface
906 Bus
907 Recording medium
908 Reader and writer
909 Input-output interface

What is claimed is:

1. A manufacturing process analysis device comprising:
at least one memory configured to store instructions; and
at least one processor configured to execute the instructions to:
in a process in which a product is manufactured, collect measured manufacturing condition values and measured quality values, both measured in time series,
wherein the measured manufacturing condition values indicate a manufacturing condition relating to the product, and wherein the measured quality values indicate a quality of the product;

compute a predicted quality value based on the measured manufacturing condition values and a model representing the manufacturing process;

compute a strength of invariant fitness with respect to each shift time, based on a difference between the computed predicted quality value and the measured quality values, wherein the shift time is a time representing a difference between time at which the manufacturing condition values were measured and time at which the quality values were measured;

specify, as one or more specific shift times, the shift times in a case the computed strength of invariant fitness satisfies a criterion;

based on the measured quality values and the measured manufacturing condition values at times going back from times at which the quality values were measured by the one or more specific shift times, analyze a state of the manufacturing process;

specify a cause of defects in the manufacturing process based on results of analysis of the state of the manufacturing process; and resolve the cause of defects in the manufacturing process.

2. The manufacturing process analysis device according to claim 1, wherein
the processor is configured to execute the instructions to compute the strength of invariant fitness, based on an auto-regressive exogenous model.

3. The manufacturing process analysis device according to claim 1, wherein
the processor is configured to execute the instructions to specify the one or more specific shift times that cause the strength of invariant fitness to be equal to or greater than a threshold value out of a plurality of the shift times.

4. The manufacturing process analysis device according to claim 1, wherein
the processor is configured to execute the instructions to specify the one or more specific shift times that maximizes the strength of invariant fitness out of a plurality of the shift times.

5. The manufacturing process analysis device according to claim 1, wherein
the processor is configured to execute the instructions to set a range of the shift time that enables the measured quality values and the measured manufacturing condition values to be in an invariant relation, based on attribute information of a first measurement unit to measure the quality values and a second measurement unit to measure the manufacturing condition values, and speed at which the process progresses.

6. The manufacturing process analysis device according to claim 1, wherein
the processor is configured to execute the instructions to, when the manufacturing process includes a plurality of sub-processes, with respect to each of the sub-processes, based on a plurality of the shift times related to the sub-process and the strength of invariant fitness related to the respective shift times, specify a representative value of the one or more specific shift times.

7. The manufacturing process analysis device according to claim 5, wherein
the processor is configured to execute the instructions to determine whether or not the shift time at which the strength of invariant fitness being capable of satisfying the criterion is appropriate as the one or more specific shift times, based on the attribute information of the first and second measurement unit.

8. The manufacturing process analysis device according to claim 5, wherein
the processor is configured to execute the instructions to, when the shift time that satisfies the criterion does not exist with respect to a specific combination relating to the first and the second measurement units, specify the one or more specific shift times, based on the attribute information or the shift time that is specified with respect to a combination different from the specific combination.

9. A manufacturing process analysis method comprising, by an information processing device:
in a process in which a product is manufactured, measuring manufacturing condition values and measuring quality values that indicate a quality of the product and were, both measured in time series,
wherein the measured manufacturing condition values indicate a manufacturing condition relating to the product, and
wherein the measured quality values indicate a quality of the product;

computing a predicted quality values based on the measured manufacturing condition values and a model representing the manufacturing process;

computing a strength of invariant fitness with respect to each shift time, based on a differences between the computed predicted quality value and the measured quality values, wherein the shift time is a time representing a difference between time at which the manufacturing condition values were measured and time at which the quality values were measured;

specifying, as one or more specific shift times, the shift times in a case the computed strength of invariant fitness satisfies a criterion;

based on the measured quality values and the measured manufacturing condition values at times going back from times at which the quality values were measured by the specified one or more specific shift times, analyzing a state of the manufacturing process;

specifying a cause of defects in the manufacturing process based on results of analysis of the state of the manufacturing process; and resolving the cause of defects in the manufacturing process.

10. A non-transitory computer readable recording medium whereupon a manufacturing process analysis program is stored, the program making a computer execute:
in a process in which a product is manufactured, measuring manufacturing condition values and measuring quality values, both measured in time series,
wherein the measured manufacturing condition values indicate a manufacturing condition relating to the product, and
wherein the measured quality values indicate a quality of the product;

computing a predicted quality value based on the measured manufacturing condition values and a model representing the manufacturing process;

computing a strength of invariant fitness with respect to each shift time, based on a difference between the computed predicted quality value and the measured quality values, wherein the shift time is a time being a difference between time at which the manufacturing condition values were measured and time at which the quality values were measured;

specifying, as one or more specific shift times, the shift times in a case the computed strength of invariant fitness satisfies a criterion;

based on the measured quality values and the measured manufacturing condition values at times going back from times at which the quality values were measured by the specific shift time, analyzing a state of the manufacturing process;

specifying a cause of defects in the manufacturing process based on results of analysis of the state of the manufacturing process; and resolving the cause of defects in the manufacturing process.

* * * * *